US007987304B2

(12) United States Patent
Aytur et al.

(10) Patent No.: US 7,987,304 B2
(45) Date of Patent: Jul. 26, 2011

(54) ASSOCIATION USING USB VIDEO ADAPTER

(75) Inventors: Turgut Aytur, Irvine, CA (US); Frederic Battaglia, Irvine, CA (US); Saurabh Garg, Irvine, CA (US); Batuhan Okur, Irvine, CA (US); Ping-Wen Ong, Irvine, CA (US); Venkatesh Rajendran, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 212 days.

(21) Appl. No.: 12/269,643

(22) Filed: Nov. 12, 2008

(65) Prior Publication Data

US 2009/0125653 A1 May 14, 2009

Related U.S. Application Data

(60) Provisional application No. 60/987,395, filed on Nov. 12, 2007.

(51) Int. Cl.
*G06F 13/12* (2006.01)
*G06F 3/00* (2006.01)

(52) U.S. Cl. ................ 710/72; 710/8; 710/10; 710/106; 348/75

(58) Field of Classification Search ........................ None
See application file for complete search history.

(56) References Cited

U.S. PATENT DOCUMENTS

2003/0103611 A1* 6/2003 Lapstun et al. .......... 379/201.01

OTHER PUBLICATIONS

Wireless Universal Serial Bus Specification, May 12, 2005, Revision 1.0, pp. i-140, pp. 141-293.*

Association Models Supplement to the Certified Wireless Universal Serial Bus Specification, Mar. 2, 2006, revision 1.0.

Wireless Universal Serial Bus Specifications, Agere, HP, Intel, Microsoft. NEC, Phillips, Samsung, May 12, 2005, Revision 1.0.

* cited by examiner

*Primary Examiner* — Eron J Sorrell
*Assistant Examiner* — Dean Phan
(74) *Attorney, Agent, or Firm* — Thomas, Kayden, Horstemeyer & Risley, LLP

(57) ABSTRACT

Certified Wireless USB 1.0 (CWUSB) defines two different types of association: cable association and numeric association. In the numeric association, the CWUSB host and device use a specific protocol to exchange the security information. At final stage of this information exchange, both host and device need to display a number asking user's feedback. Once this is done, both host and device will be able to generate the connection key as the shared secret for the following secured communication. One problem of this numeric association method is that device needs to be able to display the numbers. For certain class of device that has capability to display an image, there is a natural way to add this function to them. A method for this class of devices is described. Another kind of association, which is not defined in the CWUSB 1.0, is manual association. User needs only to manually type in the Connection Key coming from the CWUSB device. There are many ways to delivery the key, but it is very easy for device that can display an image.

5 Claims, 5 Drawing Sheets

ASSOCIATION USING USB VIDEO ADAPTER

CROSS-REFERENCE TO RELATED APPLICATION(S)

This application claims the benefit of the filing date of U.S. Provisional patent application No. 60/987,395, filed Nov. 12, 2007, the disclosure of which is incorporated by reference within.

BACKGROUND OF THE INVENTION

Certified Wireless USB 1.0 defines two different types of association: cable association and numeric association. In the numeric association, the CWUSB (Certified Wireless Universal Serial Bus) host and device use a specific protocol to exchange the security information. At final stage of this information exchange, both host and device need to display a number asking user's feedback. If these two numbers are the same, user acknowledge the fact by pressing "Accept" or "OK" button (or any equivalent action for confirmation). Once this is done, both host (master) and device (slave) will be able to generate the connection key as the shared secret for the following secured communication.

BRIEF SUMMARY OF THE INVENTION

One problem of this numeric association method is that the device needs to be able to display the numbers. For a certain class of device that has capability to display an image, there is a natural way to add this function to them. This application describes the method for this class of devices.

Another kind of association, which is not defined in the CWUSB 1.0, is manual association. User only needs to manually type in the Connection Key coming from the CWUSB device. There are many ways to delivery the key, but it is very easy for a device that can display an image.

A Connection Context defined in CWUSB consists of three 16-bytes values: Connection Host ID (CHID), Connection Device ID (CDID) and Connection Key (CK). The purpose of association process is to share the same connection context between the host and the device. The CK is the shared secret, which is one major component to derive the other keys used in the secure communication between host and device.

There are many different kinds of USB devices in the market now that can connect a monitor with VGA cable on one side and connect to host computer through USB cable on the other side. Following is a list of such kind of device currently available in the market: Sitecom USB 2.0 VGA Adapter; TRITTON SEE2 USB 2.0 VGA Adapter; Startech USB 2.0 to VGA Dual Display Adapter; Viewport USB to VGA Adapter; Port Authority2 USB 2.0 to SVGA Adapter; and DisplayLink USB to DVI Display Adapter.

BRIEF DESCRIPTION OF THE DRAWINGS

Please note that the drawings shown in this specification may not be drawn to scale and the relative dimensions of various elements in the diagrams are depicted schematically and not to scale.

DETAILED DESCRIPTION OF THE INVENTION

These devices use special drivers on the host computer to create a virtual display card and register for the computer to add extra display device. The driver then accesses the video subsystem of the computer system in order to convert the display contents (i.e. the screen information) into its own data format to deliver them to the display adapter using the USB protocol.

Figure 1:
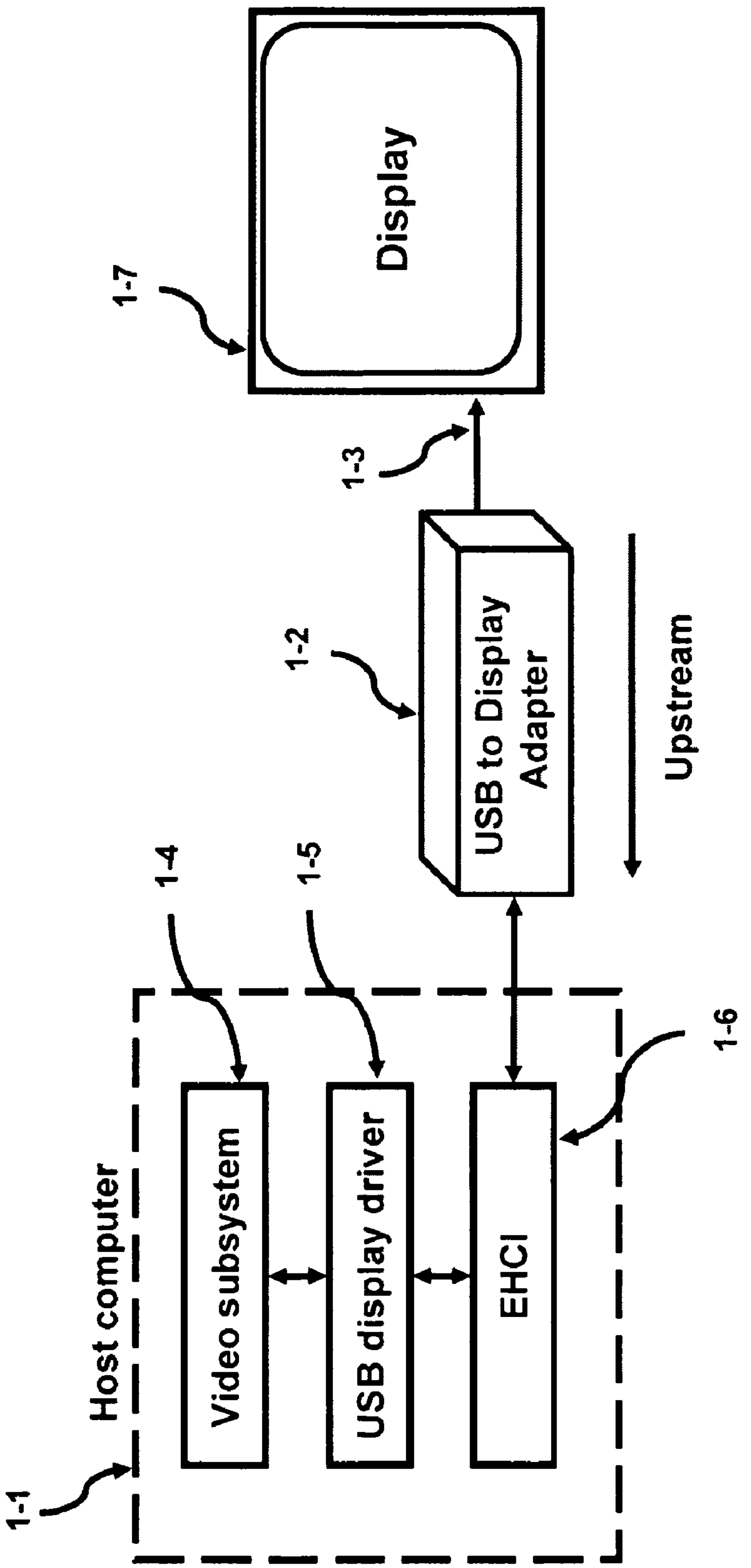
FIG. 1 (Prior art)
FIG. 1 depicts a host computer connected to a USB Display adapter.

FIG. 1 illustrates a host computer 1-1 coupled to a USB to Display adapter 1-2 that connects to a monitor 1-7. Inside the host computer 1-1, the video subsystem 1-4 exchanges information with the USB display driver 1-5. The driver 1-15 interfaces to the EHCI (Enhanced Host Controller Interface) block 1-6 which also connects to the USB to Display Adapter 1-2. The adapter's output 1-3 provides the video signal. This signal 1-3 is provided to the monitor 1-7. The upstream direction is shown below the USB to Display adaptor.

To easily convert this class of device into a wireless one, we could connect a CWUSB device adapter to this USB display adapter. Depending on which type of wireless host is used, the whole system is depicted in FIG. 2 where the WHCI (Wireless Host Controller Interface) is located in the host computer 2-1.

Figure 2:
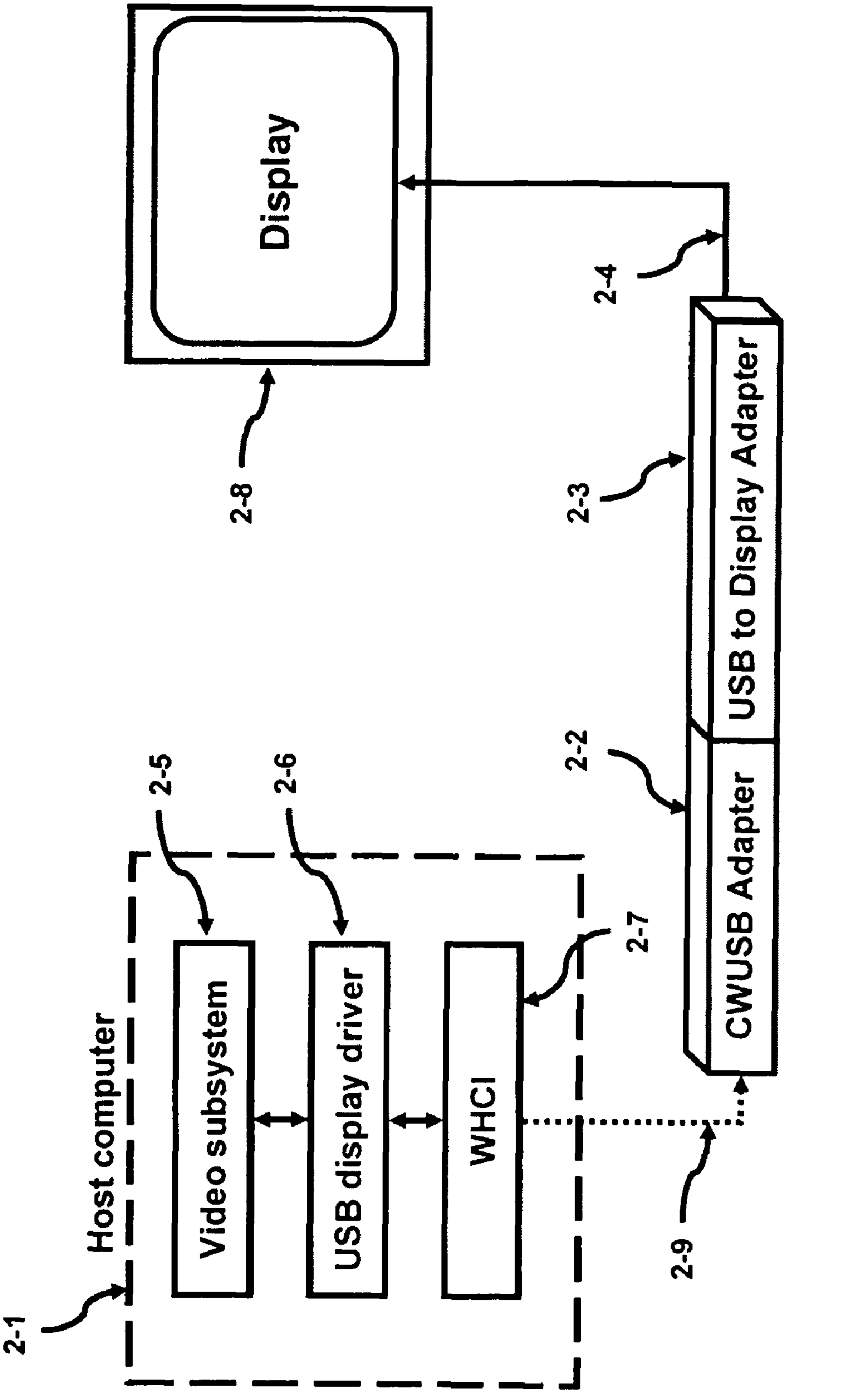
FIG. 2 shows a CWUSB Adapter wirelessly connected to the host computer and coupling to the USB Adapter Display adapter in accordance with the present invention.

FIG. 2 illustrates a host computer 2-1 coupled to a CWUSB adapter 2-2 wirelessly 2-9. The CWUSB adapter 2-2 is coupled to the USB to Display adapter 2-3. The output of the USB to Display adapter 2-3 connects to a monitor 2-8 via the output wire or connection 2-4. Inside the host computer 2-1, the video subsystem 2-5 exchanges information with the USB display driver 2-6. The WHCI block 2-7 interfaces the block 2-6 and the CWUSB adapter 2-2. WHCI 2-7 is a native host embedded in the host computer 2-1.

In order for this interface to work, the CWUSB adapter needs to associate with the host. Since we have the display mechanism handy in this case, using numeric association is a nature choice. The CWUSB adapter needs to generate the numeric digits in its frame buffer (or anything equivalent). Then it will use the appropriate USB protocol to communicate with the USB Display Adapter in order for it to display the image generated by the CWUSB adapter.

Figure 3:
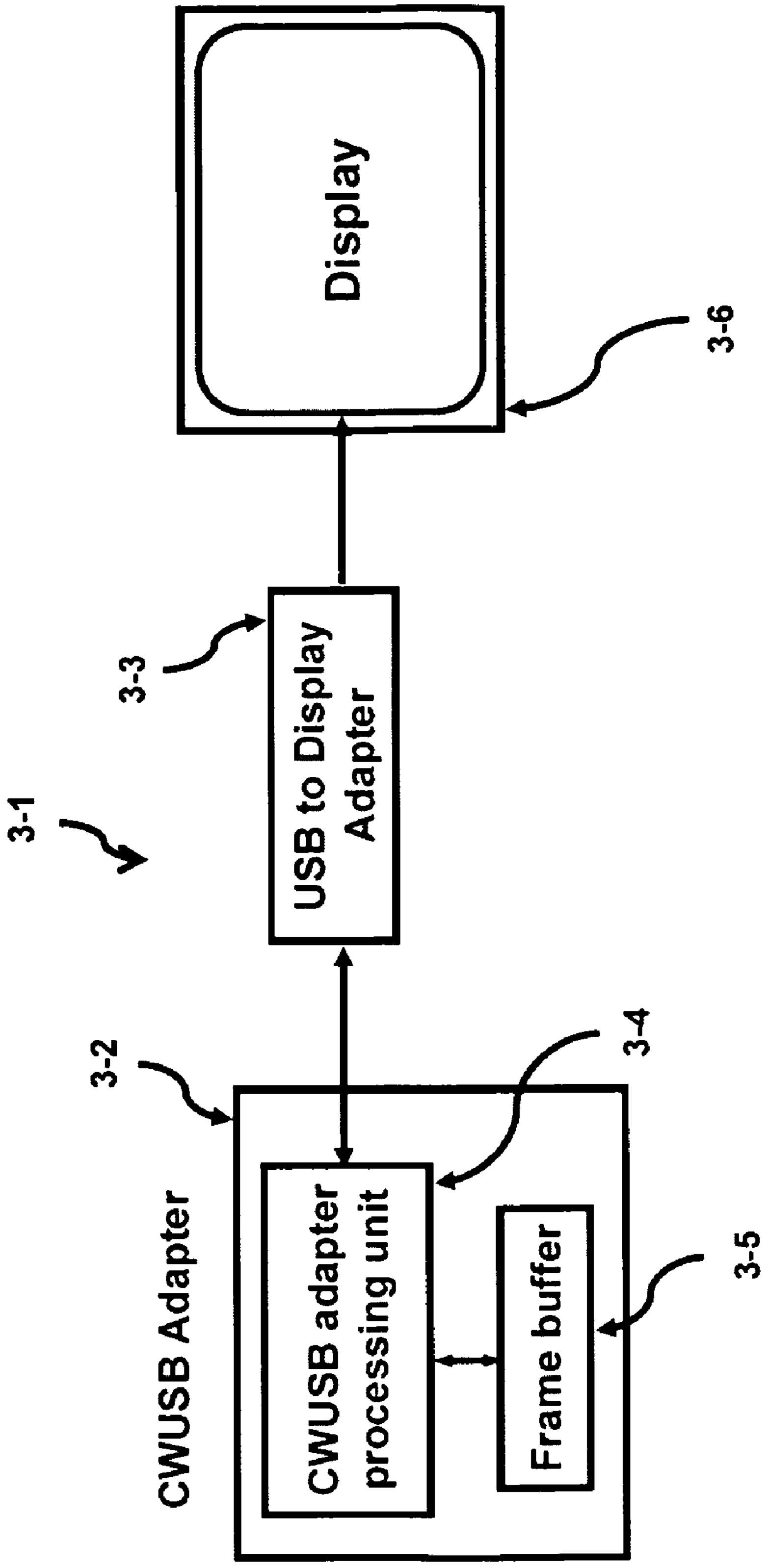
FIG. 3 shows a close-up of the CWUSB Adapter connected to the USB Adapter Display adapter in accordance with the present invention.

FIG. 3 illustrates a block diagram 3-1 of the interface between the CWUSB adapter 3-2 and the USB to Display adapter 3-3. Inside of the CWUSB Adapter 3-2, the CWUSB adapter processing unit 3-4 communicates with the frame buffer 3-5. The USB to Display adapter 3-3 connects to the adapter 3-2 and to the display 3-6 as shown in FIG. 3. The frame buffer creates a video frame and contains the image of the number that is displayed on the display.

Implementation:

Hardware: The CWUSB adapter needs to have a frame buffer memory or equivalent (e.g. display information description data structure) in order to save the generated numeric information.

Software: Additional software is required (shown as the USB to Display Adaptor 3-3, for example) in order to utilize the display capability of the USB Display Adapter. This is for the Numeric Association case.

Figure 4:
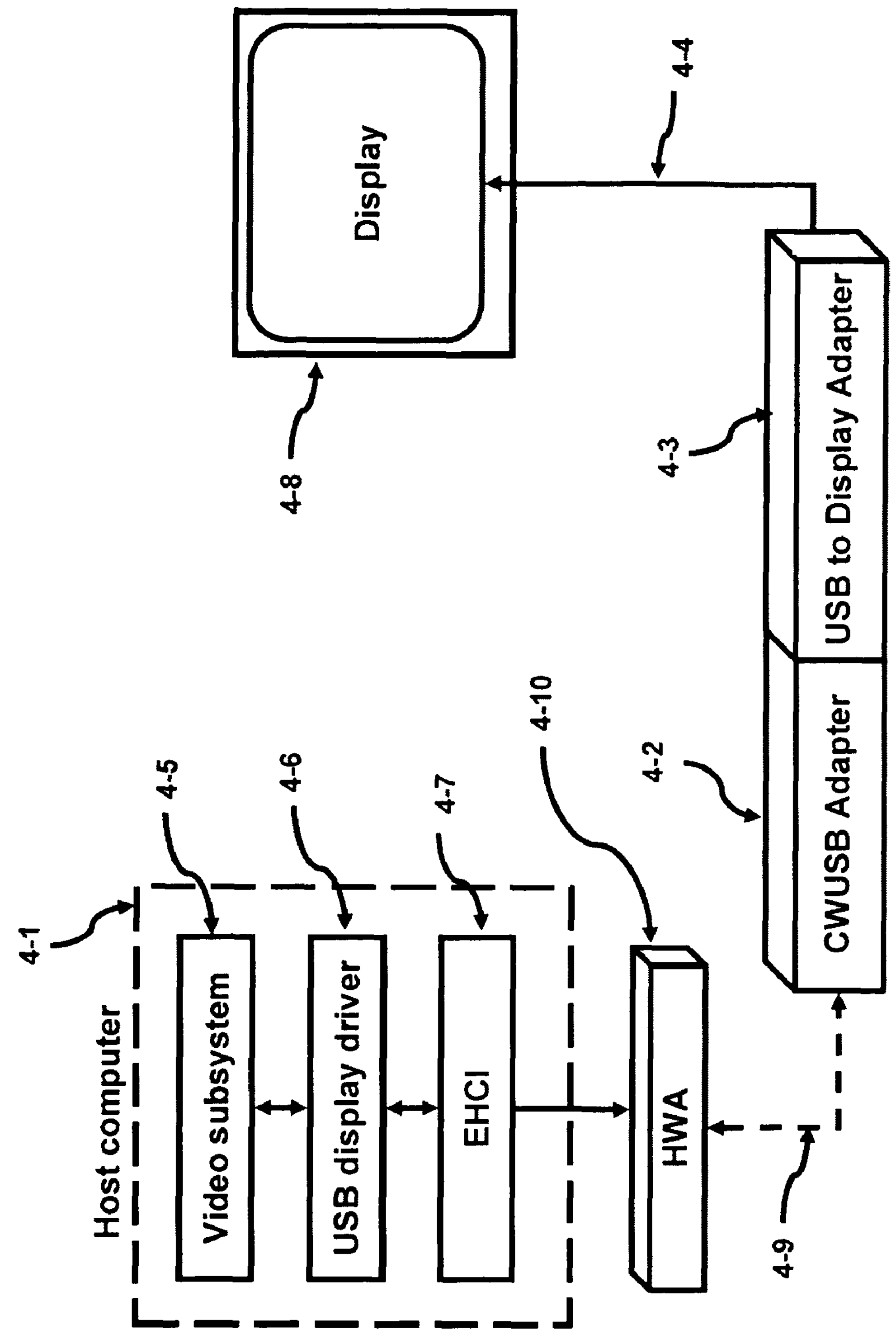
FIG. 4 shows a CWUSB Adapter wirelessly connected to a HWA (Host Wired Adaptor). The HWA couples the host computer to the CWUSB Adapter while the USB Display Adapter couples the CWUSB Adapter to the display in accordance with the present invention.

FIG. 4 illustrates a host computer 4-1 coupled to a CWUSB adapter 4-2 wirelessly 4-9 after passing through the HWA 4-10. The CWUSB 1.0 standard describes how the HWA functions. The CWUSB adapter 4-2 is coupled to the USB to Display adapter 4-3. The output of the USB to Display adapter 4-3 connects to a monitor 4-8 via the output wire or connection 4-4. Inside the host computer 4-1, the video subsystem 4-5 exchanges information with the USB display driver 4-6. The EHCI block 4-7 interfaces the block 4-6 and the HWA 4-10.

In numeric association, the frame buffer contains the image of derived digits that helps to provide encrypted and security capability. Numeric association is an elaborate association that generates a derived value using an algorithm. The conventional algorithm uses a 3,072 bits prime number to compute the derived value. Once the value is determined, the value needs to be displayed. Since device contains a display, the derived value can be shown on the display. The next step is to view the displayed digits generated in the host computer which also has a display.

Figure 5:
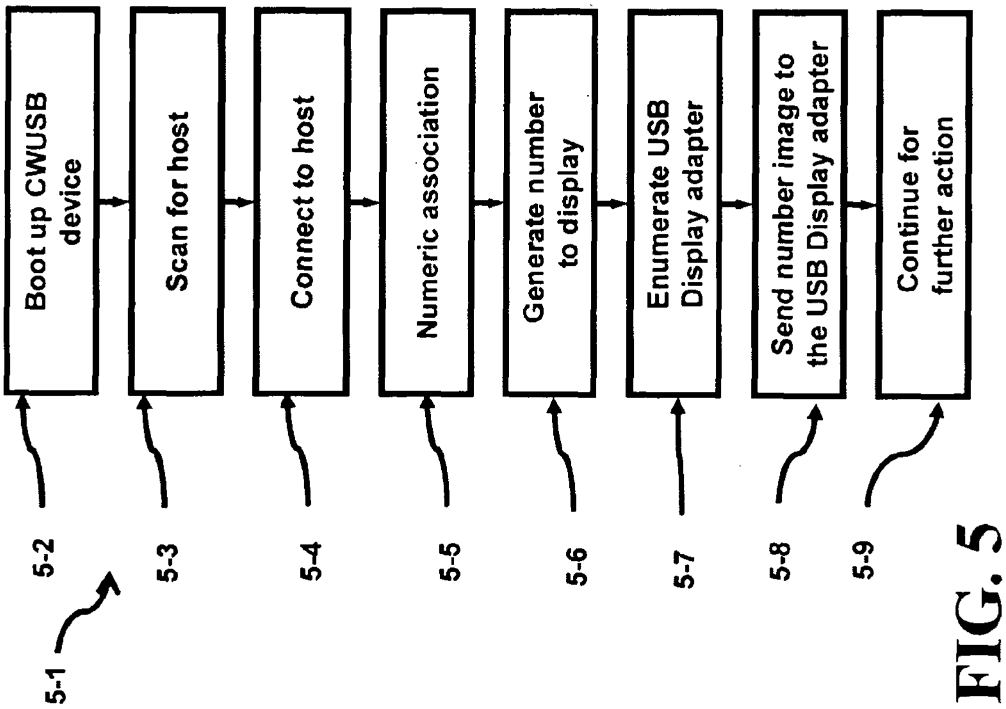
FIG. 5 shows flow chart of Display adapter using numeric association in accordance with the present invention.

FIG. 5 illustrates a flow chart 5-1 for the numeric association. Once the CWUSB device boots up 5-2 then it scans for a host 5-3 after which once one is found, the CWUSB wirelessly connects to the host 5-4. Once the CWUSB is connected to the host, they perform a numeric association 5-5. At the last step of the numeric association, the device generates results and creates a number to the display 5-6. The CWUSB adapter enumerates the USB display adapter 5-7 and sends the number image in the frame buffer to the USB display adapter to show on the display connected to USB display adapter 5-8 awaiting further action 5-9.

Figure 6:
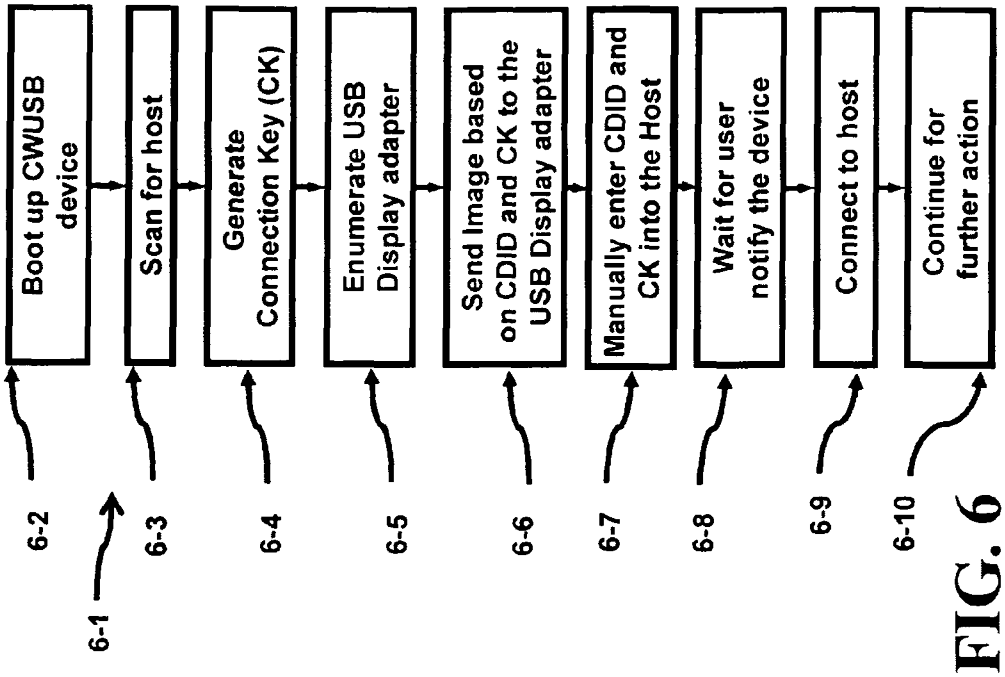
FIG. 6 shows flow chart of Display adapter using manual association in accordance with the present invention.

For manual association, we use steps shown in FIG. 6. The difference here is that the CWUSB device randomly generates the connection key than using the Numeric Association algorithm. After the key information is displayed, the user can enter the connection key and CDID manually into the host database. Once that is done, the user can confirm the entry of the connection key and CDID by, say, pressing a button on the CWUSB device. After this confirmation, the CWUSB device can start the normal connection procedure to the host.

FIG. 6 illustrates a flow chart 6-1 for the manual association. Once the CWUSB device boots up 6-2 then it scans for a host 6-3 after which once one is found, the CWUSB device generates a Connection Key 6-4. The CWUSB device then enumerates the USB Display adapter 6-5. CWUSB device generates the connection context image and sends the image to the USB Display adapter 6-6. The user manually enters the CDID and CK shown on the display into the host 6-7. The user acknowledges by providing user confirmation 6-8. Then the CWUSB device becomes connected to the host after normal connection procedure 6-9. The system continues for further action 6-10.

There are at least two different variations in terms of how CWUSB device can interact with the USB Display Adapter: 1) USB Display Adapter could add some special vendor request in order for CWUSB adapter to send the numeric information. This approach will save the CWUSB from generating the number image itself. It also eases the requirement for CWUSB Adapter to understand the special protocol used to generate and send the image; and 2) USB Display Adapter could have additional connection (other than USB, e.g. serial poll, $I^2C$, etc.) that the CWUSB Adapter could use to send the number information to the display adapter. This approach eliminates the requirement of special USB vendor request. But it requires new hardware and software supports for the new connection method.

Compared to the Numeric Association, the manual association is simpler in terms of software requirements, but demands more from the user. To reduce the load of the manual input, the CWUSB device could generate simple CDID and CK just for easy manual input. Once the secure connection is established, the host is free to reset the connection context at any time.

The basic principles of the invention are outlined below. For example, a host can be considered to be a master while the device can be considered to be a slave. Each master or slave can generate a random number or seed. The data manipulation used in this invention uses an exponential and modulating operation. The exponential operation raises two to the power of the random number. The modulation operation performs against a 3072 bit prime number. When these two operations are applied to the random number, the derived number is generated which has 384 bytes. Both the master and slave generate their own derived numbers. The interface in the CWUSB is wireless connection using UWB (Ultra Wide Band) modulation and sends the derived numbers to the other side of the wireless link. The hashing operation shortens the length of the device derived number to 32 bytes from 384 bytes. This number is also wirelessly sent to the host. At this point, both master and slave can use the same defined algorithm to create the connection key and the digits to be displayed on both displays. The user views both displays and then lets the master and slave know that the two numbers match to establish a communication network that will allow a secure connection to be created as like the one that can be created in the cable association procedure.

Finally, it is understood that the above description are only illustrative of the principle of the current invention. It is understood that the various embodiments of the invention, although different, are not mutually exclusive. In accordance with these principles, those skilled in the art may devise numerous modifications without departing from the spirit and scope of the invention. For example, an LCD can be placed in CWUSB adaptor to display a number. The invention can be practiced using other host other than a computer, for example; PDA or a cell phone.

What is claimed is:

1. An method of performing a manual association on a Certified Wireless Universal Serial Bus (CWUSB) device over a wireless communication channel comprising the steps of:

booting up the CWUSB device;

scanning for a host;

creating a Connection Device ID (CDID) and a Connection Key (CK);

enumerating a USB Display adaptor;

sending an image based on the CDID and CK to the USB Display adaptor;

manually entering the CDID and CK into the host by a user;

waiting for the user to notify the CWUSB device; and continuing to perform further action;

thereby performing the manual association over the wireless communication channel.

2. The method of claim 1, further comprising the steps of: forming a more secure communication channel by sending a newly created connection context across the wireless communication channel.

3. The method of claim 1, wherein a host database located on the host stores values of the CHID, CDID and CK; and a device database located on the device stores values of the CHID, CDID and CK.

4. The method of claim 1, whereby the wireless communication channel uses UWB modulation.

5. The method of claim 1, wherein the host is a personal computer, PDA, cell phone, or intelligent TV.

* * * * *